US010723587B2

(12) United States Patent
Hattori

(10) Patent No.: US 10,723,587 B2
(45) Date of Patent: Jul. 28, 2020

(54) ELEVATOR SYSTEM FOR MONITORING A STATE OF AN ELEVATOR INSTALLED IN A BUILDING

(71) Applicant: Mitsubishi Electric Corporation, Chiyoda-ku (JP)

(72) Inventor: Tomohiro Hattori, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 84 days.

(21) Appl. No.: 15/775,842

(22) PCT Filed: Mar. 14, 2016

(86) PCT No.: PCT/JP2016/057980
§ 371 (c)(1),
(2) Date: May 14, 2018

(87) PCT Pub. No.: WO2017/158684
PCT Pub. Date: Sep. 21, 2017

(65) Prior Publication Data
US 2018/0370759 A1    Dec. 27, 2018

(51) Int. Cl.
*B66B 1/34*   (2006.01)
*H04W 36/16*  (2009.01)
(Continued)

(52) U.S. Cl.
CPC ............. *B66B 1/3461* (2013.01); *B66B 3/00* (2013.01); *B66B 3/002* (2013.01); *B66B 5/00* (2013.01);
(Continued)

(58) Field of Classification Search
USPC ........................................................ 187/393
See application file for complete search history.

(56) References Cited

U.S. PATENT DOCUMENTS 10,038,590 B2 *  7/2018  Zourzouvillys ......... H04L 29/06
10,039,019 B2 *  7/2018  Mufti ..................... H04W 24/04
(Continued)

FOREIGN PATENT DOCUMENTS

CN      103910260 A    7/2014
JP    2002-223307 A    8/2002
(Continued)

OTHER PUBLICATIONS

Combined Office Action and Search Report dated Aug. 16, 2019 in Chinese Patent Application No. 201680083100.2, 11 pages (with unedited computer generated English translation).
(Continued)

*Primary Examiner* — Christopher Uhlir
(74) *Attorney, Agent, or Firm* — Oblon, McClelland, Maier & Neustadt, L.L.P.

(57) ABSTRACT

An elevator system stores, in a server, information on an elevator installed in a building that is communicably connected to a data center in which the server is installed, the building and the data center being communicable independently via a first network and a second network, respectively, wherein the building includes: an information collection device configured to collect information on the elevator; a sorting device configured to determine which of the first network and the second network is to be used as a transmission path via which the information on the elevator collected by the information collection device is to be transmitted to the data center; and a communication device configured to transmit the information on the elevator collected by the information collection device to the data center via the transmission path determined by the sorting device.

9 Claims, 9 Drawing Sheets

(51) Int. Cl.
*B66B 3/00* (2006.01)
*B66B 5/00* (2006.01)
*H04L 29/12* (2006.01)
*H04W 4/14* (2009.01)
*H04W 84/04* (2009.01)

(52) U.S. Cl.
CPC ........ *B66B 5/0018* (2013.01); *H04L 61/2007* (2013.01); *H04W 4/14* (2013.01); *H04W 84/042* (2013.01)

(56) References Cited

U.S. PATENT DOCUMENTS

| | | | |
|---|---|---|---|
| 2007/0079367 A1* | 4/2007 | Ishikawa | H04L 63/1416 726/13 |
| 2019/0389693 A1* | 12/2019 | Sha | B66B 1/3461 |

FOREIGN PATENT DOCUMENTS

| | | |
|---|---|---|
| JP | 2007-124154 A | 5/2007 |
| JP | 2008-37603 A | 2/2008 |
| JP | 2015-13730 A | 1/2015 |

OTHER PUBLICATIONS

International Search Report dated May 31, 2016 in PCT/JP2016/057980 filed Mar. 14, 2016.

Taiwanese Office Action dated Dec. 19, 2017 in corresponding Taiwanese Application 105121088 (with partial English machine translation).

* cited by examiner

130: SORTING DEVICE
131: MODE CHANGE CONTROL UNIT
132: INFORMATION DETERMINATION UNIT
133: PATH CHANGE UNIT
134: DATA FORMAT CHANGE UNIT
135: NOTIFICATION UNIT
136: NOTIFICATION CONTROL UNIT
137: STORAGE UNIT

220: SMS MESSAGE TRANSMITTING/RECEIVING DEVICE
221: TRANSMISSION/RECEPTION CONTROL UNIT
222: LOG FORMAT CHANGE UNIT

210: SERVER
211  SERVER CONTROL UNIT
212: SERVER STORAGE UNIT
213: NETWORK MONITORING UNIT

320: SMS MESSAGE TRANSMITTING/RECEIVING DEVICE
321· TRANSMISSION/RECEPTION CONTROL UNIT
322: RESPONSE CHANGE UNIT

FIG. 7

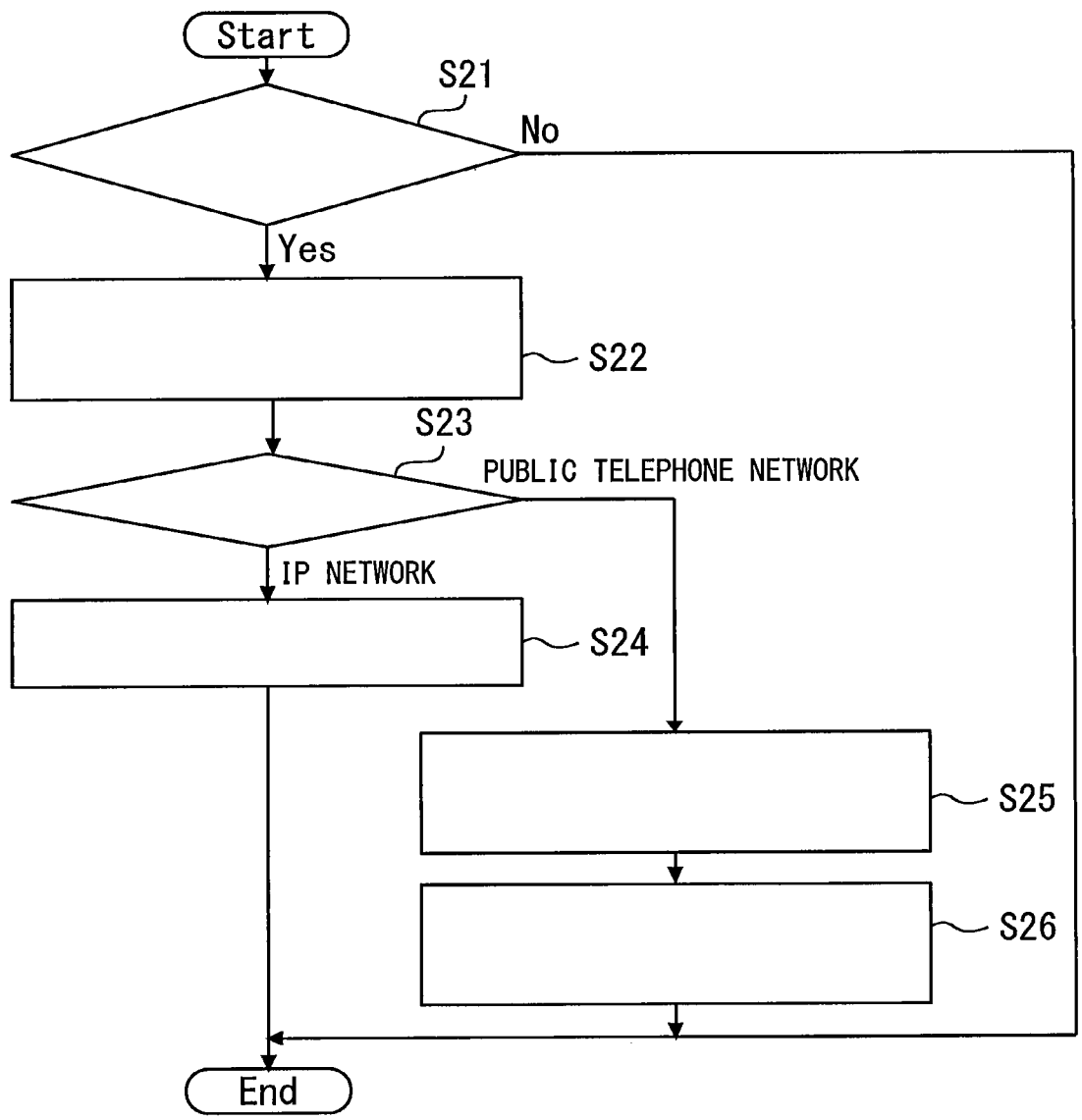

S21: NOTIFICATION CONDITION SATISFIED?
S22: CREATE NOTIFICATION CONTENTS FOR NOTIFICATION BY IP NETWORK AND STORE INFORMATION INSIDE SORTING DEVICE
S23: NOTIFICATION PATH?
S24: PERFORM NOTIFICATION TO DATA CENTER VIA IP NETWORK
S25: CREATE NOTIFICATION CONTENTS FOR NOTIFICATION BY PUBLIC TELEPHONE NETWORK AND STORE INFORMATION INSIDE SORTING DEVICE
S26: PERFORM NOTIFICATION TO INFORMATION CENTER VIA PUBLIC TELEPHONE NETWORK
* NOTIFICATION TO DATA CENTER IS ARBITRARY

S40: DETECTED ANOMALY OR RECOVERY OF IP NETWORK?
S41: CHANGE STORAGE METHOD OF LOG UPON OCCURRENCE OF ANOMALY
S42: NOTIFY INFORMATION CENTER AND BUILDING
      OF STATE (ANOMALY OR RECOVERY) OF IP NETWORK

S60: DETECTED ANOMALY OR RECOVERY OF IP NETWORK?
S61: CHANGE RESPONSE (WORK FLOW, ETC.) UPON OCCURRENCE OF ANOMALY IN BUILDING
S62: NOTIFY DATA CENTER AND BUILDING OF STATE (ANOMALY OR RECOVERY) OF IP NETWORK

ELEVATOR SYSTEM FOR MONITORING A STATE OF AN ELEVATOR INSTALLED IN A BUILDING

TECHNICAL FIELD

The present invention relates to an elevator system.

BACKGROUND ART

Conventionally, for the purpose of effectively dispatching a maintenance person to an elevator managed by a maintenance server which remotely monitors and manages the elevator even when the maintenance server goes down, a system is known which includes: a plurality of elevator controllers which control a plurality of elevators, respectively; and a maintenance server which is connected to the plurality of elevator controllers by a dedicated line or a telephone line and which is provided inside a remotely-arranged control center, wherein the system is provided with maintenance terminals which are carried by maintenance persons and which are capable of obtaining maintenance data recorded in the maintenance server, by communicating with the maintenance server, the maintenance server regularly updates information on a maintenance terminal in charge of maintenance of each elevator, and when it is determined that an elevator controller is unable to normally communicate with the maintenance server, the system switches to communication between the elevator controller and the maintenance terminal via a public line in order to enable a maintenance person to obtain information on an elevator from the maintenance terminal (for example, refer to PTL 1).

CITATION LIST

Patent Literature

[PTL 1] Japanese Patent Application Laid-open No. 2015-013730

SUMMARY OF INVENTION

Technical Problem

However, with the conventional elevator system described in PTL 1, when an elevator is no longer capable of normally communicating with a server due to an occurrence of a failure on a communication line (network) between the elevator and the server, information on the elevator cannot be stored and accumulated in the server and the fact that an anomaly has occurred in the elevator cannot be remotely perceived, despite the fact that a server (a maintenance server) storing the information on the elevator has not gone down.

The present invention has been made in consideration of such problems and an object thereof is to obtain an elevator system capable of storing information on an elevator in a server and remotely perceiving that an anomaly has occurred in the elevator even when a failure occurs on a communication network between the elevator and the server.

Solution to Problem

An elevator system according to the present invention which stores, in a server, information on an elevator installed in a building that is communicably connected to a data center in which the server is installed, the building and the data center being communicable independently via a first network and a second network, respectively, wherein the building is provided with: an information collection device configured to collect information on the elevator; a sorting device configured to determine which of the first network and the second network is to be used as a transmission path via which the information on the elevator collected by the information collection device is to be transmitted to the data center; and a communication device configured to transmit the information on the elevator collected by the information collection device to the data center via the transmission path determined by the sorting device.

Advantageous Effects of Invention

An elevator system according to the present invention produces an advantageous effect of being capable of storing information on an elevator in a server and remotely perceiving that an anomaly has occurred in the elevator even when a failure occurs on a communication network between the elevator and the server.

BRIEF DESCRIPTION OF THE DRAWINGS

FIG. 7 is a flow chart showing a notification operation of the sorting device provided in the elevator system related to the first embodiment of the present invention.

DESCRIPTION OF EMBODIMENT

An embodiment of the present invention will now be described with reference to the accompanying drawings. In the respective drawings, same or comparable portions will be denoted by same reference signs and overlapping descriptions will be simplified or omitted as deemed appropriate. It should be noted that the present invention is not limited to the embodiment described below and various modifications can be made thereto without departing from the spirit of the present invention.

First Embodiment

Figure 1:
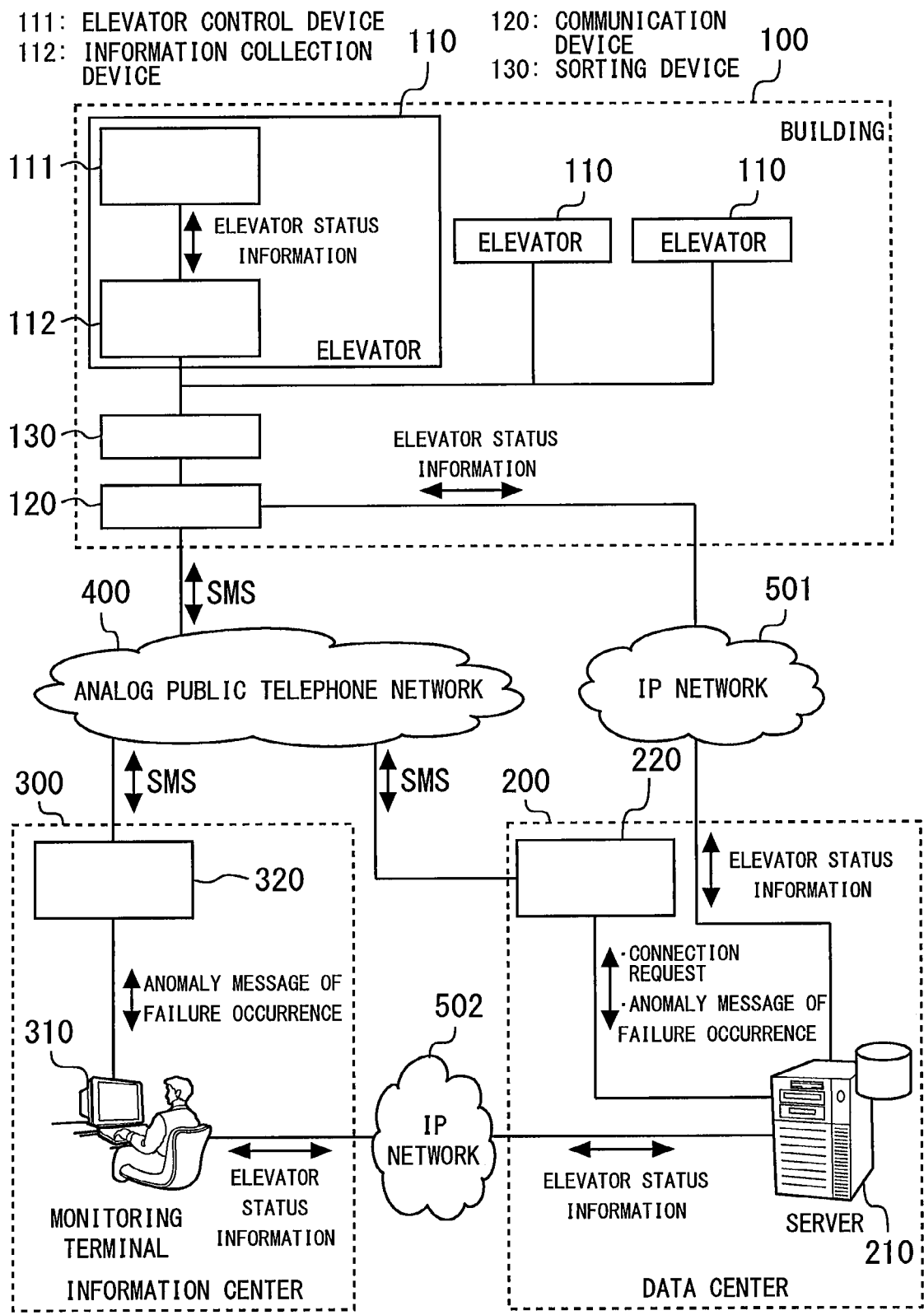
FIG. 1 is a diagram illustrating an overall configuration of an elevator system related to a first embodiment of the present invention.
Figure 2:
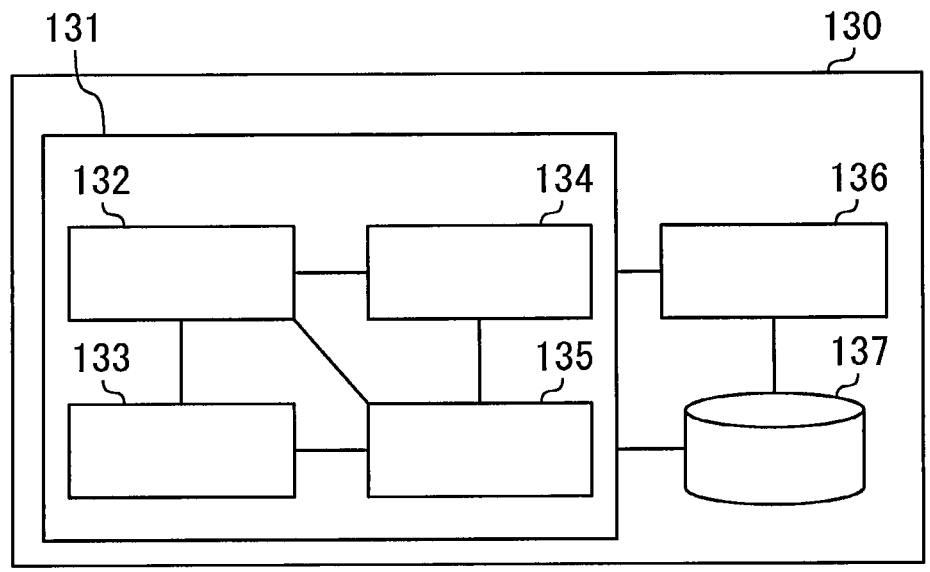
FIG. 2 is a block diagram showing a configuration of a sorting device provided in the elevator system related to the first embodiment of the present invention.
Figure 3:
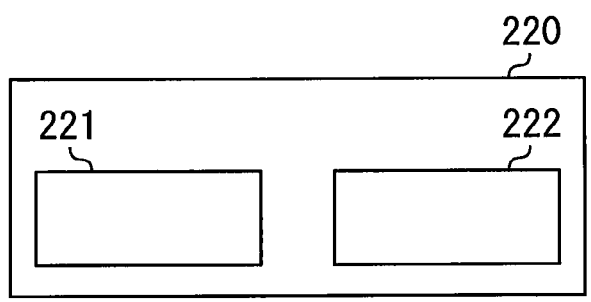
FIG. 3 is a block diagram showing a configuration of a first SMS message transmitting/receiving device provided in the elevator system related to the first embodiment of the present invention.
Figure 4:
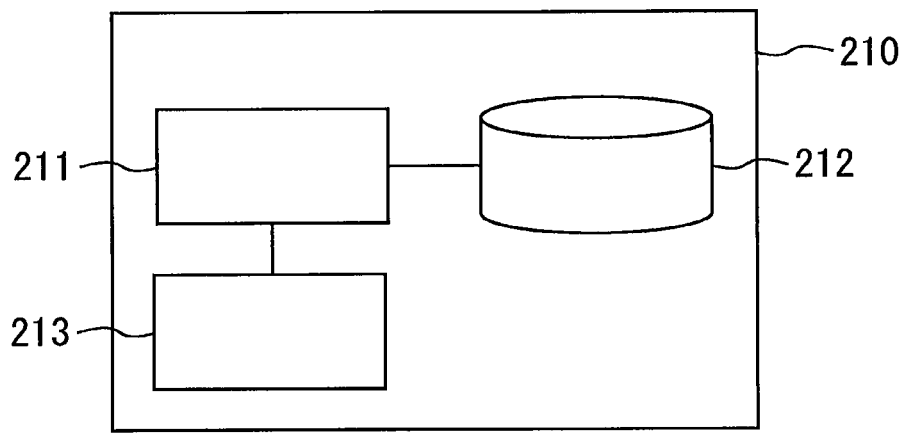
FIG. 4 is a block diagram showing a configuration of a server provided in the elevator system related to the first embodiment of the present invention.
Figure 5:
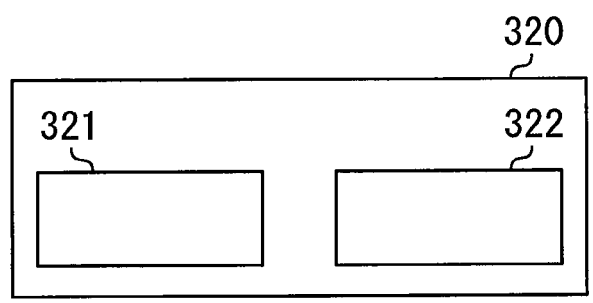
FIG. 5 is a block diagram showing a configuration of a second SMS message transmitting/receiving device provided in the elevator system related to the first embodiment of the present invention.
Figure 6:
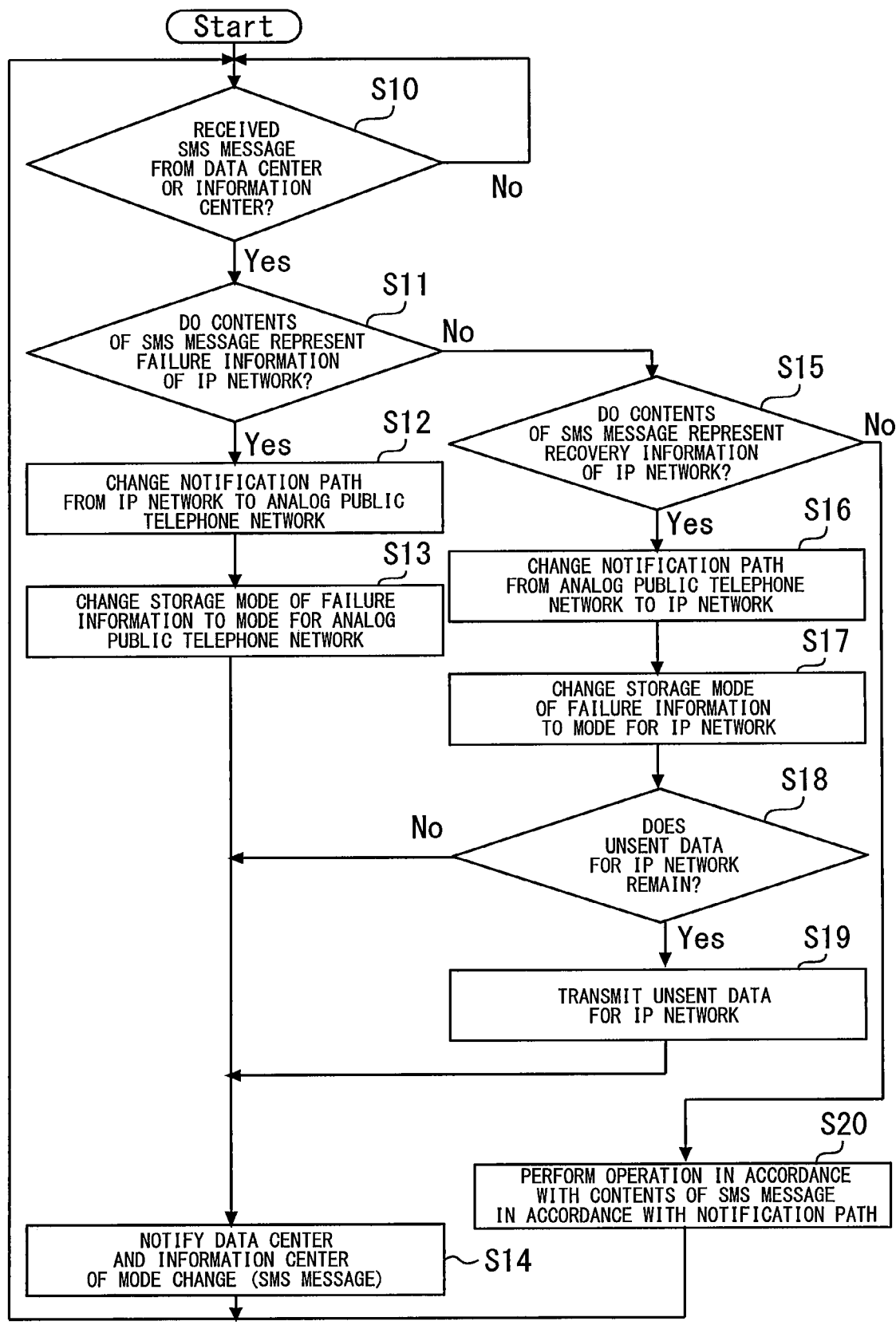
FIG. 6 is a flow chart showing a mode change operation of the sorting device provided in the elevator system related to the first embodiment of the present invention.
Figure 8:
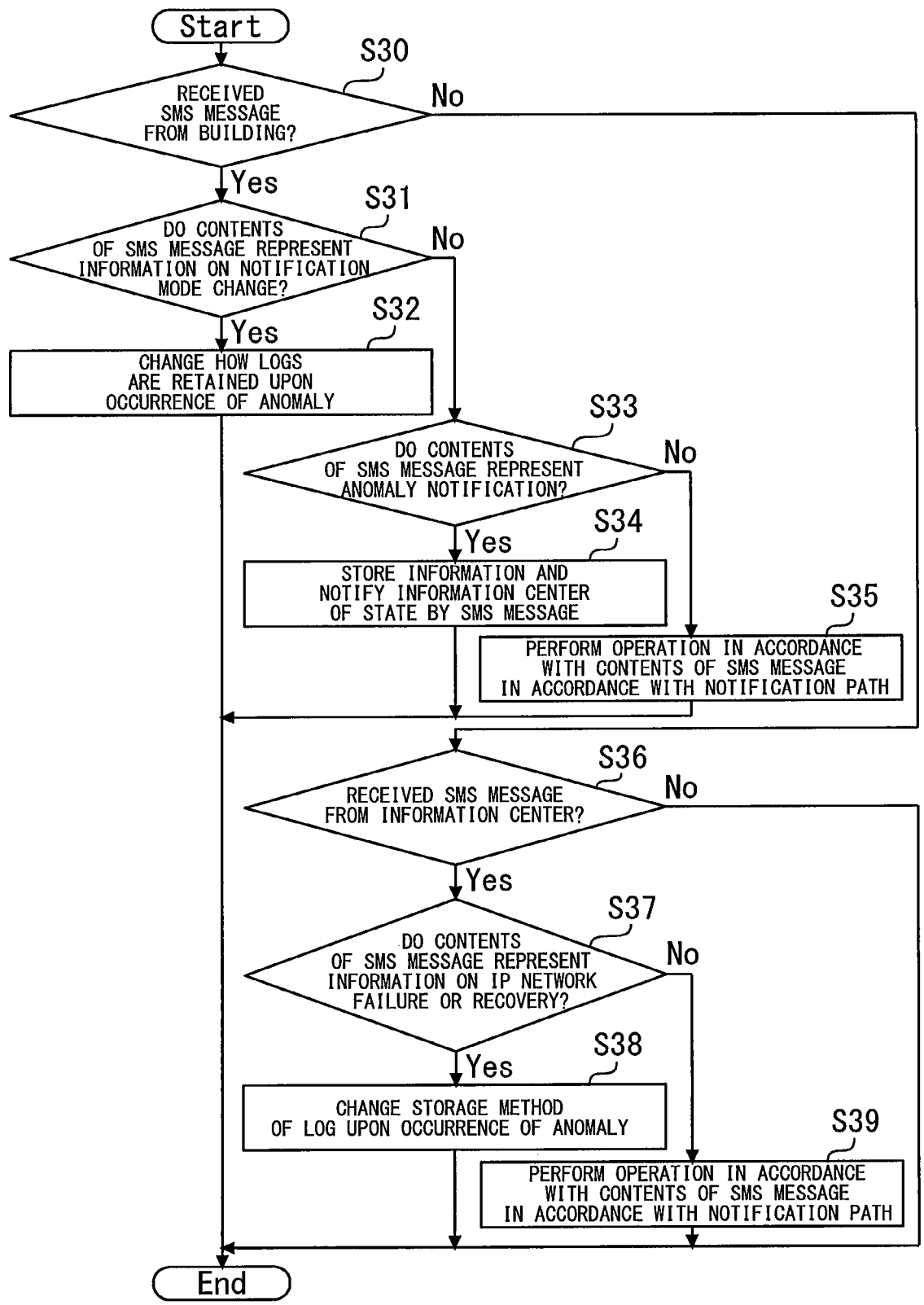
FIG. 8 is a flow chart showing an operation during SMS message reception of an SMS message transmitting/receiving device of a data center (a first SMS message transmitting/receiving device), which is provided in the elevator system related to the first embodiment of the present invention.
Figure 9:
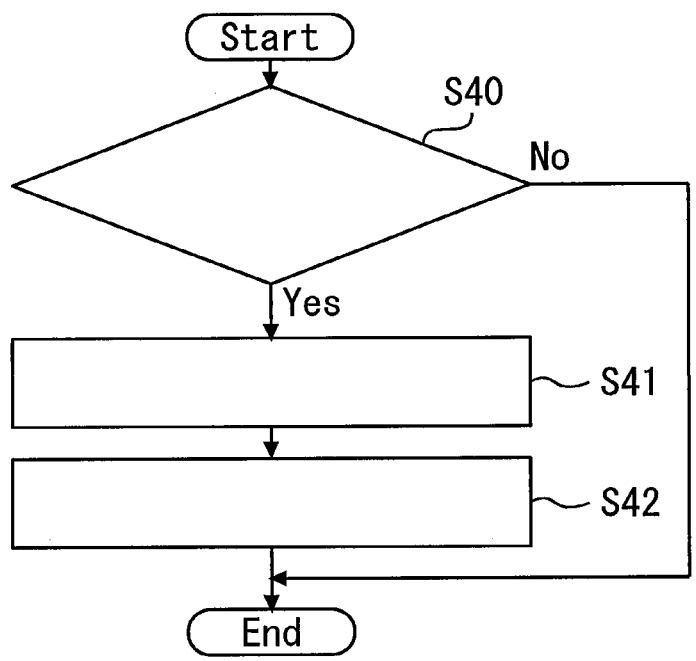
FIG. 9 is a flow chart showing an operation during SMS message transmission of the SMS message transmitting/receiving device of the data center (the first SMS message transmitting/receiving device), which is provided in the elevator system related to the first embodiment of the present invention.
Figure 10:
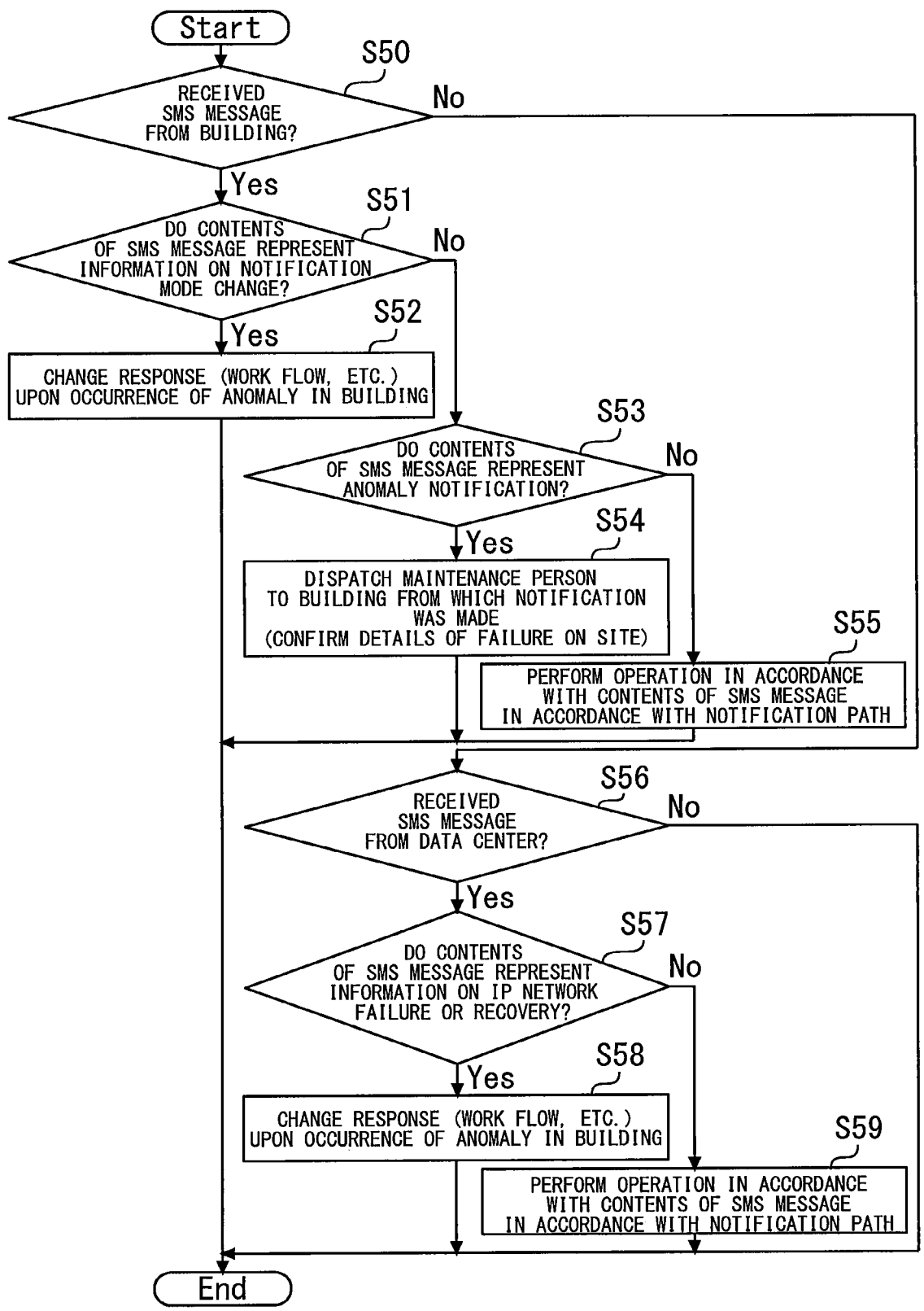
FIG. 10 is a flow chart showing an operation during SMS message reception of an SMS message transmitting/receiving device of an information center (a second SMS message transmitting/receiving device), which is provided in the elevator system related to the first embodiment of the present invention.
Figure 11:
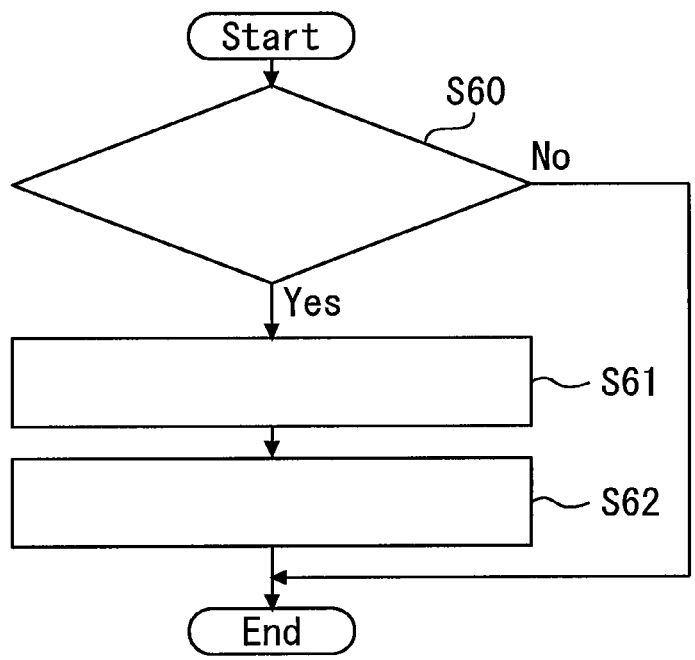
FIG. 11 is a flow chart showing an operation during SMS message transmission of the SMS message transmitting/receiving device of the information center (the second SMS message transmitting/receiving device), which is provided in the elevator system related to the first embodiment of the present invention.

FIGS. 1 to 11 are related to a first embodiment of the present invention, in which: FIG. 1 is a diagram illustrating an overall configuration of an elevator system; FIG. 2 is a block diagram showing a configuration of a sorting device provided in the elevator system; FIG. 3 is a block diagram showing a configuration of a first SMS message transmitting/receiving device provided in the elevator system; FIG. 4 is a block diagram showing a configuration of a server provided in the elevator system; FIG. 5 is a block diagram showing a configuration of a second SMS message transmitting/receiving device provided in the elevator system; FIG. 6 is a flow chart showing a mode change operation of the sorting device; FIG. 7 is a flow chart showing a notification operation of the sorting device; FIG. 8 is a flow chart showing an operation during SMS message reception of an SMS message transmitting/receiving device of a data center (a first SMS message transmitting/receiving device); FIG. 9 is a flow chart showing an operation during SMS message transmission of the SMS message transmitting/receiving device of the data center (the first SMS message transmitting/receiving device); FIG. 10 is a flow chart showing an operation during SMS message reception of an SMS message transmitting/receiving device of an information center (a second SMS message transmitting/receiving device); and FIG. 11 is a flow chart showing an operation during SMS message transmission of the SMS message transmitting/receiving device of the information center (the second SMS message transmitting/receiving device).

As shown in FIG. 1, the elevator system according to the first embodiment of the present invention is provided with an elevator 110 installed in a building 100. In addition, the elevator system is configured to remotely monitor the elevator 110 installed in the building 100. One or more elevators 110 or, in this case, for example, three elevators 110 are installed in the building 100.

Each elevator 110 is provided with an elevator control device 111 and an information collection device 112. The elevator control device 111 controls operations of the elevator 110. When controlling operations of the elevator 110, the elevator control device 111 uses information related to a state of the elevator 110. Specifically, for example, information related to the state of the elevator 110 includes whether the elevator 110 is moving or whether the elevator 110 has stopped, a position, a direction of operation, and a state of registration of the elevator 110, and the presence or absence of an anomaly with respect to the elevator 110 and, (when there is an anomaly), contents or the like of the anomaly.

The information collection device 112 collects information on the elevator 110 from the elevator control device 111. The information on the elevator 110 collected by the information collection device 112 includes information related to a state of the elevator 110 described above. In addition, the information on the elevator 110 collected by the information collection device 112 also includes car number information of the elevator 110. Car number information of the elevator 110 refers to information which enables the elevator 110 to be uniquely identified among the plurality of elevators 110 installed in the building 100. Specifically, for example, a serial number assigned to each elevator 110 in each building 100 or the like can be used as the car number information of the elevator 110.

For example, the information on the elevator 110 collected by the information collection device 112 is temporarily stored in a storage device (not shown) or the like provided in the information collection device 112. Moreover, FIG. 1 exemplifies a case where the information collection device 112 is provided in each elevator 110. However, this example is not restrictive and the information collection device 112 may be provided in each building 100 instead of in each elevator 110. In this case, the information collection device 112 may be configured to collect information on all elevators 110 installed in a building 100.

The building 100 in which the elevator 110 is installed is communicably connected to a data center 200. Specifically, the building 100 and the data center 200 are communicably connected via an analog public telephone network 400 and a first IP network 501, respectively. The first IP network 501 is a communication network using IP (Internet Protocol) as a communication protocol. Data communicated using the first IP network 501 is basically digital data.

The analog public telephone network 400 is a communication network including a land line network and a mobile communication network for PHS (Personal Handy-phone System), mobile phones, and the like. Data communicated using the analog public telephone network 400 is basically analog data.

Communication between the building 100 and the data center 200 using the analog public telephone network 400 and communication between the building 100 and the data center 200 using the first IP network 501 can be performed mutually independently without one affecting the other. In other words, the building 100 and the data center 200 are connected so as to be communicable independently via the first IP network 501 that is a first network and the analog public telephone network 400 that is a second network, respectively.

In addition, the building 100 in which the elevator 110 is installed is also communicably connected to an information center 300. Specifically, the building 100 and the information center 300 are communicably connected via the analog public telephone network 400 described above that is the second network.

A communication device 120 is provided in the building 100. The communication device 120 is a communication interface used by the building 100 to communicate with the information center 300 or the data center 200 via the first IP network 501 (the first network) and the analog public telephone network 400 (the second network). The communication device 120 is at least provided with a router function for communicating using the first IP network 501 and a modem function for communicating using the analog public telephone network 400.

In this case, each node connected to the first IP network 501 can be uniquely identified by an IP address. In other words, each building 100 connected to the data center 200 can be uniquely identified using, for example, an IP address assigned to the communication device 120 of each building 100. In addition, in communication using the first IP network 501, a car number of an elevator 110 of each building 100 can be made uniquely identifiable using, for example, NAT (Network Address Translation), IP masquerade, or the like.

For example, the data center 200 manages information necessary for maintenance and management of the elevator 110 in an integrated manner across many regions. A server 210 is installed in the data center 200. The server 210 stores information on each elevator 110 installed in each building 100. In addition, a first SMS message transmitting/receiving device 220 is installed in the data center 200. The first SMS message transmitting/receiving device 220 transmits and receives SMS (Short Message Service) messages to and from the communication device 120 of the building 100 or a second SMS message transmitting/receiving device 320 (to be described later) of the information center 300 via the analog public telephone network 400.

The server 210 is connected to the first IP network 501. In addition, the server 210 is also connected to the analog public telephone network 400 via the first SMS message transmitting/receiving device 220.

For example, the information center 300 is installed in each region where the building 100 in which the elevator 110 is installed is located. The information center 300 monitors buildings 100 in a region for which the information center 300 is responsible. An observer, a maintenance person, and the like of the elevator 110 are on duty at all times at the information center 300. In addition, in the event of an emergency such as an occurrence of an anomaly in an elevator 110 of a building 100 in the region for which the information center 300 is responsible, necessary personnel such as a maintenance person can be dispatched from the information center 300 to the building 100 in which the anomaly had occurred.

A monitoring terminal 310 is installed in the information center 300. The monitoring terminal 310 is to be used by an observer in the information center 300 in order to monitor a state of an elevator 110 of a building 100 for which the information center 300 is responsible. The data center 200 and the information center 300 are communicably connected by a second IP network 502 that is a third network. In addition, the monitoring terminal 310 is capable of acquiring information on the elevator 110 stored in the server 210 via the second IP network 502 (the third network) and displaying the acquired information.

Furthermore, the second SMS message transmitting/receiving device 320 is installed in the information center 300. The second SMS message transmitting/receiving device 320 is connected to the analog public telephone network 400. In addition, the second SMS message transmitting/receiving device 320 transmits and receives SMS messages to and from the communication device 120 of the building 100 or the first SMS message transmitting/receiving device 220 of the data center 200 via the analog public telephone network 400. Moreover, the monitoring terminal 310 is not only connected to the second IP network 502 but also connected to the analog public telephone network 400 via the second SMS message transmitting/receiving device 320.

As described above, the elevator system according to the first embodiment of the present invention is a system which stores, in the server 210, information on the elevator 110 installed in the building 100 which is communicably connected to the data center 200 in which the server 210 is installed, the building 100 and the data center 200 being communicable independently via the first IP network 501 that is a first network and the analog public telephone network 400 that is a second network, respectively.

In addition, a sorting device 130 is installed in the building 100. In order to store information on the elevator 110 in the server 210, the sorting device 130 determines a transmission path via which the information on the elevator 110 is to be transmitted to the data center 200. More specifically, the sorting device 130 determines which of the first network (the first IP network 501) and the second network (the analog public telephone network 400) is to be used as the transmission path via which the information on the elevator 110 collected by the information collection device 112 is to be transmitted to the data center 200.

The communication device 120 of the building 100 transmits the information on the elevator 110 collected by the information collection device 112 to the data center 200 via the transmission path determined by the sorting device 130. In doing so, when the transmission path is the second network (the analog public telephone network 400), the communication device 120 uses SMS to transmit the information on the elevator 110 collected by the information collection device 112.

Moreover, when transmitting information to the data center 200 from the building 100 using the first IP network 501, the following procedure may be followed from the perspectives of ensuring security and the like. First, a connection request command is transmitted from the data center 200 to the building 100 by SMS or the like using the analog public telephone network 400. Subsequently, the communication device 120 having received the connection request command via the analog public telephone network 400 establishes a connection to the data center 200 via the first IP network 501.

The data center 200 receives information on the elevator 110 transmitted on the transmission path determined by the sorting device 130. In addition, the server 210 stores the information on the elevator 110 received by the data center 200.

In addition, the sorting device 130 also transmits information on the determined transmission path to the data center 200. Furthermore, the sorting device 130 changes a data format used when transmitting the information on the elevator 110 in accordance with the determined transmission path. In other words, as described earlier, communication via the first IP network 501 is digital data communication. Therefore, when the first IP network 501 is determined as the transmission path, the sorting device 130 changes the information on the elevator 110 to be transmitted to a data format suitable for transmission as digital data.

In addition, as described earlier, when the transmission path is the analog public telephone network 400, information on the elevator 110 is transmitted using SMS. Therefore, when the analog public telephone network 400 is determined as the transmission path, the sorting device 130 changes the information on the elevator 110 to be transmitted to a format suitable for transmission by SMS. Specifically, for example, the sorting device 130 converts information on the elevator 110 into text data. In addition, since there is a limit to an amount of data that can be transmitted by one SMS message, the information on the elevator 110 is made dividable into and transmittable as a plurality of SMS messages. Furthermore, in order to reduce an amount of transmitted data, items and the like of the information on the elevator 110 to be transmitted are narrowed down to a highly important bare minimum.

Based on the information on the transmission path transmitted from the sorting device 130, the server 210 changes a log storage method of the information on the elevator 110. Specifically, when the transmission path is the first IP network 501, for example, the server 210 stores the transmitted information on the elevator 110 without modification as needed. On the other hand, when the transmission path is the analog public telephone network 400, for example, the server 210 temporarily holds received information and collectively stores information included in a plurality of SMS messages. In addition, for example, the server 210 only stores a bare minimum of items in the transmitted information on the elevator 110.

Normally, the sorting device 130 determines the first network (the first IP network 501) as the transmission path. In addition, when the sorting device 130 receives anomaly information of the first network (the first IP network 501) from outside of the building 100, the sorting device 130 determines the second network (the analog public telephone network 400) as the transmission path.

In order to monitor anomalies of the first network (the first IP network 501), the elevator system is provided with a network monitoring unit 213 to be described later. When the network monitoring unit 213 detects an anomaly of the first IP network 501 that is the first network, the network monitoring unit 213 transmits anomaly information of the first network to the building 100. In this case, for example, the network monitoring unit 213 is provided in the server 210 of the data center 200. For example, the anomaly information of the first network is transmitted by SMS to the building 100 by the second network (the analog public telephone network 400) via the first SMS message transmitting/receiving device 220.

Next, a configuration example of the sorting device 130 provided with the functions described above will be described with reference to FIG. 2. The sorting device 130 is provided with a mode change control unit 131. The mode change control unit 131 controls changes in modes (hereinafter, referred to as "notification modes") when a notification is made from the building 100 to the data center 200 or the information center 300.

When the notification mode is changed, specifically, the transmission path described above when making a notification (hereinafter, referred to as a "notification path"), a data format of the information on the elevator 110 when making the notification, and a temporary storage method in the sorting device 130 of the information on the elevator 110 prior to making the notification are changed.

The mode change control unit 131 is provided with an information determination unit 132, a path change unit 133, a data format change unit 134, and a notification unit 135.

When an SMS message is transmitted to the building 100 via the analog public telephone network 400 from outside of the building 100 or, in this case, particularly, from the data center 200 or the information center 300, the information determination unit 132 determines whether or not contents of the SMS message represent anomaly information of the first IP network 501 that is the first network.

Anomaly information of the first IP network 501 includes information describing an occurrence of a failure in the first IP network 501 and information describing a recovery from a failure having occurred in the first IP network 501. When contents of the SMS message represent anomaly information of the first IP network 501, the information determination unit 132 also determines whether the anomaly information describes an occurrence of a failure in the first IP network 501 or whether the anomaly information describes a recovery from a failure having occurred in the first IP network 501.

When the information determination unit 132 determines that contents of an SMS message represent anomaly information of the first IP network 501, the path change unit 133 changes a notification path to be used when subsequently making a notification. More specifically, when the information determination unit 132 determines that contents of an SMS message represent information describing that a failure has occurred in the first IP network 501, the path change unit 133 changes the notification path to the analog public telephone network 400. In addition, when the information determination unit 132 determines that contents of an SMS message represent information describing that the first IP network 501 has recovered, the path change unit 133 changes the notification path to the first IP network 501.

When the information determination unit 132 determines that contents of an SMS message represent anomaly information of the first IP network 501, the data format change unit 134 changes a data format to be used when subsequently making a notification. More specifically, when the information determination unit 132 determines that contents of an SMS message represent information describing that a failure has occurred in the first IP network 501, the data format change unit 134 changes the data format of a notification to a data format for the analog public telephone network 400. In addition, when the information determination unit 132 determines that contents of an SMS message represent information describing that the first IP network 501 has recovered, the data format change unit 134 changes the data format of a notification to a data format for the first IP network 501.

The notification unit 135 is for notifying the data center 200 and the information center 300 that the notification mode has been changed when the mode change control unit 131 changes a subsequent notification mode. When the information determination unit 132 determines that contents of an SMS message represent anomaly information of the first IP network 501 and the mode change control unit 131 changes the notification mode, the notification unit 135 causes the communication device 120 to transmit an SMS message describing that the notification mode has been changed to the data center 200 and the information center 300.

As described earlier, when the notification mode is changed, a notification path to be used by subsequent notifications is changed. Therefore, the notification unit 135 notifying the data center 200 of a mode change means that information on a notification path to be used by subsequent notifications or, in other words, information on the transmission path of the information on the elevator 110 described earlier is to be transmitted to the data center 200.

In addition, the sorting device 130 is provided with a notification control unit 136 and a storage unit 137. The notification control unit 136 controls notifications made from the building 100 to the data center 200 or the information center 300. More specifically, the notification control unit 136 determines whether or not a notification condition set in advance is satisfied based on information on the elevator 110 collected by the information collection device 112. Specifically, for example, cases of an occurrence of an anomaly in the elevator 110 which requires a notification to be made to the data center 200 or the information center 300 or the like are set as the notification condition.

When the notification condition is satisfied, the notification control unit 136 first creates notification data from the information on the elevator 110 collected by the information collection device 112. A data format of the notification data is changed in accordance with the notification mode changed by the mode change control unit 131. Specifically, the notification control unit 136 creates notification data from the information on the elevator 110 in a data format of the present notification mode having been changed by the data format change unit 134. Notification data created by the notification control unit 136 is stored in the storage unit 137 of the sorting device 130.

In doing so, the notification control unit 136 first creates notification data for the first IP network 501 regardless of the present notification mode. In addition, when the notification path of the notification mode is the first IP network 501, the notification data for the first IP network 501 is stored in the storage unit 137 to conclude the creation and storage of the notification data.

In addition, when the notification path of the notification mode is the analog public telephone network 400, the notification control unit 136 creates notification data for the analog public telephone network 400 based on notification data for the first IP network 501. Specifically, the notification control unit 136 creates notification data for the analog public telephone network 400 by performing conversion into text data, division, extraction of a highly important bare minimum of items, and the like with respect to the notification data for the first IP network 501. Subsequently, both the notification data for the first IP network 501 and the notification data for the analog public telephone network 400 are stored in the storage unit 137 to conclude the creation and storage of the notification data.

The notification control unit 136 controls the communication device 120 to make a notification to the data center 200 or the information center 300 in accordance with the present notification mode changed by the mode change control unit 131. The notification is made by having the communication device 120 of the building 100 transmit the notification data stored in the storage unit 137 of the sorting device 130 using the notification path of the present notification mode or, in other words, the transmission path determined by the sorting device 130. In addition, with the notification, the communication device 120 transmits the information on the elevator 110 to the data center 200 via the notification path or, in other words, the transmission path determined by the sorting device 130.

In addition, when the sorting device 130 receives recovery information of the first IP network 501 from outside of the building 100, the sorting device 130 retransmits, via the first IP network 501, information on the elevator 110 collected by the information collection device 112 during a period in which the analog public telephone network 400 had been the notification path. In other words, in this case, when the information determination unit 132 determines that contents of an SMS message represent information describing that the first IP network 501 has recovered, the notification control unit 136 transmits unsent notification data for the first IP network 501 to the data center 200.

As described earlier, the notification control unit 136 creates notification data for the first IP network 501 regardless of the present notification mode and the created notification data is stored in the storage unit 137. In addition, when the notification path is the analog public telephone network 400, notification data for the analog public telephone network 400 is created and the created notification data for the analog public telephone network 400 is transmitted to the server 210. In this case, the notification data for the first IP network 501 remains in the storage unit 137 in an unsent state.

In consideration thereof, when the first IP network 501 recovers, if unsent notification data for the first IP network 501 remains in the storage unit 137, the notification control unit 136 transmits the unsent data to the data center 200.

Items and the like of the information on the elevator 110 included in the notification data for the analog public telephone network 400 have been narrowed down from the perspectives of data capacity and the like. In consideration thereof, upon recovery of the first IP network 501, by transmitting the notification data for the first IP network 501 having been created during a failure of the first IP network 501, the notification data transmitted by the data center 200 side with the analog public telephone network 400 can be complemented.

A case where unsent notification data for the first IP network 501 is spontaneously transmitted from the building 100 side to the data center 200 upon recovery of the first IP network 501 has been described. However, instead of having the unsent notification data for the first IP network 501 spontaneously transmitted from the building 100 side, the unsent notification data for the first IP network 501 may be configured to be transmitted from the building 100 to the data center 200 when a request is made from the data center 200.

While the storage unit 137 is provided in the sorting device 130 in this example, a storage unit 137 for temporarily storing notification data may be provided in the information collection device 112.

Next, a configuration example of the first SMS message transmitting/receiving device 220 installed in the data center 200 will be described with reference to FIG. 3. The first SMS message transmitting/receiving device 220 is provided with a first transmission/reception control unit 221 and a log format change unit 222. The first transmission/reception control unit 221 controls a transmission process of an SMS message from the data center 200 and a reception process of an SMS message to the data center 200.

The log format change unit 222 checks contents of an SMS message to the data center 200 which has been received in an SMS message reception process by the first transmission/reception control unit 221. In addition, when an SMS message of a notification mode change notification transmitted from the building 100 is received by the data center 200, the log format change unit 222 changes a log format to be stored in the server 210.

In this case, the log format to be stored in the server 210 refers to a storage method of information on the elevator 110 in the server 210. In addition, the storage method of information on the elevator 110 in the server 210 includes whether or not a data format is converted upon storage of information, items in the information of the elevator 110 to be stored, frequency of storage, and the like.

FIG. 4 shows a configuration example of the server 210 installed in the data center 200. In the configuration example shown in FIG. 4, the server 210 is provided with a server control unit 211, a server storage unit 212, and a network monitoring unit 213. The server control unit 211 controls processes performed by the server 210 in general. The server storage unit 212 is a storage unit for storing information on each elevator 110 transmitted from each building 100 as a log.

As described earlier, the log format to be stored in the server 210 or, in other words, the storage method of information on the elevator 110 in the server 210 is changed by the log format change unit 222 of the first SMS message transmitting/receiving device 220. In addition, the server control unit 211 stores the information on the elevator 110 transmitted from the building 100 in the server storage unit 212 in accordance with the present log format changed by the log format change unit 222.

As described earlier, the monitoring terminal 310 of the information center 300 is capable of acquiring information on the elevator 110 stored in the server 210 via the second IP network 502 (the third network) and displaying the acquired information. In the data center 200, when a request for information on a specific elevator 110 is received from the monitoring terminal 310 of the information center 300, first, the server control unit 211 acquires information on the requested specific elevator 110 from the server storage unit 212. Subsequently, the server control unit 211 transmits the acquired information on the elevator 110 via the second IP network 502 to the monitoring terminal 310 having made the request.

The network monitoring unit 213 monitors the state of the first IP network 501 that is the first network. Specifically, for example, the network monitoring unit 213 uses various network management commands such as ping to regularly check whether or not the building 100 and the data center 200 can communicate with each other in a normal manner using the first IP network 501.

In addition, when the network monitoring unit 213 detects an anomaly (a failure) of the first IP network 501, the network monitoring unit 213 transmits anomaly information of the first IP network 501 to the building 100. Furthermore, when the network monitoring unit 213 detects a recovery of the first IP network 501 after detecting an anomaly (a failure) of the first IP network 501, the network monitoring unit 213 transmits information describing that the first IP network 501 has recovered to the building 100. In this case, when the network monitoring unit 213 transmits anomaly information of the first IP network 501, the network monitoring unit 213 transmits the anomaly information to the building 100 via the analog public telephone network 400 using SMS via the first SMS message transmitting/receiving device 220.

Next, a configuration example of the second SMS message transmitting/receiving device 320 installed in the information center 300 will be described with reference to FIG. 5. The second SMS message transmitting/receiving device 320 is provided with a second transmission/reception control unit 321 and a response change unit 322. The second transmission/reception control unit 321 controls a transmission process of an SMS message from the information center 300 and a reception process of an SMS message to the information center 300.

The response change unit 322 checks contents of an SMS message to the information center 300 which has been received in an SMS message reception process by the second transmission/reception control unit 321. In addition, when an SMS message of a notification mode change notification transmitted from the building 100 is received by the information center 300, the response change unit 322 changes contents of a response to be made by the information center 300 when a notification from the building 100 is subsequently received.

Contents of a response to be made by the information center 300 when receiving a notification from the building 100 include, for example, a work flow upon notification in the information center 300 and assistive operations performed by equipment of the information center 300 including the monitoring terminal 310 in order to smoothly execute the work flow, of which specific examples include instruction of a work procedure, display of information necessary for work, and the like.

A flow of processes performed by the sorting device 130 installed in the building 100 of the elevator system configured as described above will be described with reference to FIGS. 6 and 7. First, FIG. 6 shows operations of the sorting device 130 upon SMS message reception. In step S10 in FIG. 6, the sorting device 130 checks whether or not the communication device 120 of the building 100 has received an SMS message transmitted from the data center 200 or the information center 300. In addition, when an SMS message transmitted from the data center 200 or the information center 300 is received, the flow proceeds to step S11.

In step S11, the information determination unit 132 checks whether or not contents of the SMS message received in step S10 represent anomaly information describing an occurrence of a failure in the first IP network 501. When the contents of the received SMS message represent anomaly information describing an occurrence of a failure in the first IP network 501, the flow proceeds to step S12.

In step S12, the path change unit 133 changes the notification path from the first IP network 501 to the analog public telephone network 400. In subsequent step S13, the data format change unit 134 changes a mode in which failure information of the elevator 110 is stored to a mode for the analog public telephone network 400. After step S13, the flow proceeds to step S14.

In step S14, the notification unit 135 causes the communication device 120 to transmit a notification describing that the notification mode has been changed to the data center 200 and the information center 300. In doing so, the communication device 120 transmits a notification mode change notification by SMS using the analog public telephone network 400. After step S14, the flow returns to step S10.

On the other hand, in step S11, when the contents of the received SMS message do not represent anomaly information describing an occurrence of a failure in the first IP network 501, the flow proceeds to step S15. In step S15, the information determination unit 132 checks whether or not contents of the SMS message received in step S10 represent information describing that the first IP network 501 has recovered from a failure. When the contents of the received SMS message represent information describing that the first IP network 501 has recovered from a failure, the flow proceeds to step S16.

In step S16, the path change unit 133 changes the notification path from the analog public telephone network 400 to the first IP network 501. In subsequent step S17, the data format change unit 134 changes a mode in which failure information of the elevator 110 is stored to a mode for the first IP network 501. After step S17, the flow proceeds to step S18.

In step S18, the notification control unit 136 checks whether or not there remains unsent notification data for the first IP network 501 in a state of being stored in the storage unit 137. When unsent notification data for the first IP network 501 does not remain in the storage unit 137, the flow proceeds to step S14.

On the other hand, when unsent notification data for the first IP network 501 remains in the storage unit 137, the flow proceeds to step S19. In step S19, the notification control unit 136 transmits the unsent notification data for the first IP network 501 stored in the storage unit 137 to the data center 200 using the first IP network 501. After step S19, the flow proceeds to step S14.

On the other hand, in step S15, when the contents of the received SMS message do not represent information describing that the first IP network 501 has recovered from a failure, the flow proceeds to step S20. In step S20, an operation is performed in accordance with the contents of the received SMS message. The contents of the SMS message in this case are an operation command from the data center 200 or the information center 300 to have the building 100 perform a specific operation and the like. Specifically, for example, the operation command includes a command specifying an operation which causes information related to a present state of the elevator 110 to be transmitted.

The sorting device 130 executes a process in accordance with the operation command included in the received SMS message. In doing so, when it is necessary to transmit information to the data center 200 or the information center 300 as in the example described earlier, the information is transmitted using the notification path of the present notification mode. After step S20, the flow returns to step S10.

Next, FIG. 7 shows operations of the sorting device 130 during notification. In step S21 in FIG. 7, the notification control unit 136 of the sorting device 130 checks whether or not the notification condition set in advance is satisfied based on information on the elevator 110 collected by the information collection device 112. If the notification condition is not satisfied, the flow of the series of operations ends.

On the other hand, when the notification condition is satisfied, the flow proceeds to step S22. In step S22, the notification control unit 136 creates notification data (notification contents) for a case of using the first IP network 501 as the notification path. In addition, the notification control unit 136 stores the created notification data in the storage unit 137 of the sorting device 130. After step S22, the flow proceeds to step S23.

In step S23, the notification control unit 136 checks whether the notification path of the present notification mode is the first IP network 501 or the analog public telephone network 400. When the notification path is the first IP network 501, the flow proceeds to step S24.

In step S24, the notification control unit 136 causes the communication device 120 to transmit the notification data stored in the storage unit 137 in step S22 to the data center 200 via the first IP network 501. Once the process of step S24 is completed, the flow of the series of operations ends.

On the other hand, in step S23, when the notification path is the analog public telephone network 400, the flow proceeds to step S25. In step S25, the notification control unit 136 creates notification data (notification contents) for a case of using the analog public telephone network 400 as the notification path. The notification data for a case of using the analog public telephone network 400 as the notification path is created based on the notification data created in step S22 for a case of using the first IP network 501 as the notification path. In addition, the notification control unit 136 temporarily stores the created notification data in the storage unit 137 of the sorting device 130.

In subsequent step S26, the notification control unit 136 causes the communication device 120 to transmit the notification data temporarily stored in the storage unit 137 in step S25 to the information center 300 via the analog public telephone network 400.

In doing so, a notification may or may not be also made directly from the building 100 to the data center 200 via the analog public telephone network 400. However, when a notification is not directly made from the building 100 to the data center 200, since the currently-notified information on the elevator 110 is stored in the server 210 of the data center 200, the notified information on the elevator 110 is to be transmitted from the information center 300 to the data center 200 via the second IP network 502. Once the process of step S26 is completed, the flow of the series of operations ends.

Next, a flow of processes performed by the first SMS message transmitting/receiving device 220 installed in the data center 200 of the elevator system will be described with reference to FIGS. 8 and 9. First, FIG. 8 shows operations of the first SMS message transmitting/receiving device 220 upon SMS message reception. In step S30 in FIG. 8, the first SMS message transmitting/receiving device 220 checks whether or not an SMS message transmitted from the building 100 has been received. When an SMS message transmitted from the building 100 is received, the flow proceeds to step S31.

In step S31, the first SMS message transmitting/receiving device 220 checks whether or not contents of the SMS message received in step S30 represent a notification of a notification mode change. When the contents of the received SMS message represent a notification of a notification mode change, the flow proceeds to step S32. In step S32, the log format change unit 222 changes a log storage method of information on the elevator 110 in the server 210 upon an occurrence of an anomaly of the elevator 110 or, in other words, when a notification is made from the building 100. Once the process of step S32 is completed, the flow of the series of operations ends.

On the other hand, in step S31, when the contents of the received SMS message do not represent a notification of a notification mode change, the flow proceeds to step S33. In step S33, the first SMS message transmitting/receiving device 220 checks whether or not contents of the SMS message received in step S30 represent an anomaly notification. When the contents of the received SMS message represent an anomaly notification, the flow proceeds to step S34.

In step S34, data of the anomaly notification received by the first SMS message transmitting/receiving device 220 is transmitted to the server 210. Subsequently, the server 210 stores information on the anomaly notification in the server storage unit 212. In addition, the first SMS message transmitting/receiving device 220 notifies the information center 300 by SMS via the analog public telephone network 400 of a state where there has been a notification from the building 100. Alternatively, the state notification may be made via the second IP network 502. Once the process of step S34 is completed, the flow of the series of operations ends.

On the other hand, in step S33, when the contents of the received SMS message do not represent an anomaly notification, the flow proceeds to step S35. In step S35, the first SMS message transmitting/receiving device 220 performs an operation in accordance with the contents of the received SMS message. The contents of the SMS message in this case are an operation command from the building 100 to have the data center 200 perform a specific operation and the like. Specifically, for example, the operation command includes a command specifying an operation which causes information related to a state of a specific elevator 110 stored in the server 210 to be transmitted.

The first SMS message transmitting/receiving device 220 executes a process in accordance with the operation command included in the received SMS message. In doing so, when it is necessary to transmit information to the building 100 as in the example described earlier, the information is transmitted using the notification path of the present notification mode. Once the process of step S35 is completed, the flow of the series of operations ends.

On the other hand, when an SMS message transmitted from the building 100 is not received in step S30, the flow proceeds to step S36. In step S36, the first SMS message transmitting/receiving device 220 checks whether or not an SMS message transmitted from the information center 300 has been received. Subsequently, when an SMS message transmitted from the information center 300 is received, the flow proceeds to step S37. When an SMS message transmitted from the information center 300 is not received, the flow of the series of operations ends.

In step S37, the first SMS message transmitting/receiving device 220 checks whether or not contents of the SMS message received in step S30 represent anomaly information of the first IP network 501 or, in other words, information describing that a failure has occurred in the first IP network 501 or information describing that the first IP network 501 has recovered from a failure. When the contents of the received SMS message represent anomaly information of the first IP network 501, the flow proceeds to step S38.

In step S38, the log format change unit 222 changes a log storage method of information on the elevator 110 in the server 210 upon an occurrence of an anomaly of the elevator 110 or, in other words, when a notification is made from the building 100. Once the process of step S38 is completed, the flow of the series of operations ends.

On the other hand, in step S37, when the contents of the received SMS message do not represent anomaly information of the first IP network 501, the flow proceeds to step S39. In step S39, the first SMS message transmitting/receiving device 220 performs an operation in accordance with the contents of the received SMS message. The contents of the SMS message in this case are an operation command from the information center 300 to have the data center 200 perform a specific operation and the like. Specifically, for example, the operation command includes a command specifying an operation which causes information related to a state of a specific elevator 110 stored in the server 210 to be transmitted.

The first SMS message transmitting/receiving device 220 executes a process in accordance with the operation command included in the received SMS message. In doing so, when it is necessary to transmit information to the building 100, the information is transmitted using the notification path of the present notification mode. Once the process of step S39 is completed, the flow of the series of operations ends.

Next, FIG. 9 shows operations of the first SMS message transmitting/receiving device 220 upon SMS message transmission. In step S40 in FIG. 9, the first SMS message transmitting/receiving device 220 checks whether or not the network monitoring unit 213 has detected an occurrence of an anomaly (a failure) of the first IP network 501 or a recovery of the first IP network 501. When the network monitoring unit 213 has not detected an anomaly or a recovery of the first IP network 501, the flow of the series of operations ends. On the other hand, when the network monitoring unit 213 detects an anomaly or a recovery of the first IP network 501, the flow proceeds to step S41.

In step S41, the log format change unit 222 changes a log storage method of information on the elevator 110 in the server 210 upon an occurrence of an anomaly of the elevator 110 or, in other words, when a notification is made from the building 100. After step S41, the flow proceeds to step S42.

In step S42, the first SMS message transmitting/receiving device 220 notifies the building 100 and the information center 300 of the state (whether an anomaly has occurred or a recovery has been made) of the first IP network 501 detected in step S40. This notification is made by SMS using the analog public telephone network 400. Once the process of step S42 is completed, the flow of the series of operations ends.

Next, a flow of processes performed by the second SMS message transmitting/receiving device 320 installed in the information center 300 of the elevator system will be described with reference to FIGS. 10 and 11. First, FIG. 10 shows operations of the second SMS message transmitting/receiving device 320 upon SMS message reception. In step S50 in FIG. 10, the second SMS message transmitting/receiving device 320 checks whether or not an SMS message transmitted from the building 100 has been received. When an SMS message transmitted from the building 100 is received, the flow proceeds to step S51.

In step S51, the second SMS message transmitting/receiving device 320 checks whether or not contents of the SMS message received in step S50 represent a notification of a notification mode change. When the contents of the received SMS message represent a notification of a notification mode change, the flow proceeds to step S52. In step S52, the response change unit 322 changes contents of a response to be made by the information center 300 when a notification from the building 100 is subsequently received. Once the process of step S52 is completed, the flow of the series of operations ends.

On the other hand, in step S51, when the contents of the received SMS message do not represent a notification of a notification mode change, the flow proceeds to step S53. In step S53, the second SMS message transmitting/receiving device 320 checks whether or not contents of the SMS message received in step S50 represent an anomaly notification. When the contents of the received SMS message represent an anomaly notification, the flow proceeds to step S54.

In step S54, the second SMS message transmitting/receiving device 320 checks contents of the received anomaly notification and notifies an observer or the like at the information center 300 to dispatch a maintenance person from the information center 300 to the building 100 from which the notification had been made. Specifically, for example, the monitoring terminal 310 is caused to display a dispatch instruction of a maintenance person to the building 100 from which the notification had been made. In addition, information on the elevator 110 from which the notification had been made may be acquired from the server 210 of the data center 200 and displayed on the monitoring terminal 310. Moreover, details of an anomaly (a failure) of the elevator 110 from which the notification had been made are to be confirmed by the maintenance person dispatched to the site. Once the process of step S54 is completed, the flow of the series of operations ends.

On the other hand, in step S53, when the contents of the received SMS message do not represent an anomaly notification, the flow proceeds to step S55. In step S55, the second SMS message transmitting/receiving device 320 performs an operation in accordance with the contents of the received SMS message. The contents of the SMS message in this case are an operation command from the building 100 to have the information center 300 perform a specific operation and the like.

The second SMS message transmitting/receiving device 320 executes a process in accordance with the operation command included in the received SMS message. In doing so, when it is necessary to transmit information to the building 100, the information is transmitted using the notification path of the present notification mode. When the notification path is the first IP network 501, the information is transmitted from the first IP network 501 via the second IP network 502 and the data center 200. Once the process of step S55 is completed, the flow of the series of operations ends.

On the other hand, when an SMS message transmitted from the building 100 is not received in step S50, the flow proceeds to step S56. In step S56, the second SMS message transmitting/receiving device 320 checks whether or not an SMS message transmitted from the data center 200 has been received. Subsequently, when an SMS message transmitted from the data center 200 is received, the flow proceeds to step S57. When an SMS message transmitted from the data center 200 is not received, the flow of the series of operations ends.

In step S57, the second SMS message transmitting/receiving device 320 checks whether or not contents of the SMS message received in step S50 represent anomaly information of the first IP network 501 or, in other words, information describing that a failure has occurred in the first IP network 501 or information describing that the anomaly information first IP network 501 has recovered from a failure. When the contents of the received SMS message represent anomaly information of the first IP network 501, the flow proceeds to step S58.

In step S58, the response change unit 322 changes contents of a response to be made by the information center 300 when a notification from the building 100 is subsequently received. Once the process of step S58 is completed, the flow of the series of operations ends.

On the other hand, in step S57, when the contents of the received SMS message do not represent anomaly information of the first IP network 501, the flow proceeds to step S59. In step S59, the second SMS message transmitting/receiving device 320 performs an operation in accordance with the contents of the received SMS message. The contents of the SMS message in this case are an operation command from the data center 200 to have the information center 300 perform a specific operation and the like.

The second SMS message transmitting/receiving device 320 executes a process in accordance with the operation command included in the received SMS message. In doing so, when it is necessary to transmit information to the building 100, the information is transmitted using the notification path of the present notification mode. When the notification path is the first IP network 501, the information is transmitted from the first IP network 501 via the second IP network 502 and the data center 200. Once the process of step S59 is completed, the flow of the series of operations ends.

Next, FIG. 11 shows operations of the second SMS message transmitting/receiving device 320 upon SMS message transmission. Moreover, the flow chart in FIG. 11 assumes a case where a network monitoring unit comparable to the network monitoring unit 213 is also installed in the information center 300.

In step S60 in FIG. 11, the second SMS message transmitting/receiving device 320 checks whether or not the network monitoring unit in the information center 300 has detected an occurrence of an anomaly (a failure) of the first IP network 501 or a recovery of the first IP network 501. When the network monitoring unit of the information center 300 has not detected an anomaly or a recovery of the first IP network 501, the flow of the series of operations ends. On the other hand, when the network monitoring unit of the information center 300 detects an anomaly or a recovery of the first IP network 501, the flow proceeds to step S61.

In step S61, the response change unit 322 changes contents of a response to be made by the information center 300 when a notification from the building 100 is subsequently received. After step S61, the flow proceeds to step S62.

In step S62, the second SMS message transmitting/receiving device 320 notifies the building 100 and the data center 200 of the state (whether an anomaly has occurred or a recovery has been made) of the first IP network 501 detected in step S60. This notification is made by SMS using the analog public telephone network 400. Once the process of step S62 is completed, the flow of the series of operations ends.

Moreover, as described earlier, the information center 300 is installed in each region where the building 100 in which the elevator 110 is installed is located. In addition, in many cases, the information center 300 is basically installed in a same country as the buildings 100 in a region for which the information center 300 is responsible.

On the other hand, for example, the data center 200 manages information necessary for maintenance and management of the elevator 110 in an integrated manner across many regions. Therefore, a country in which the data center 200 is located may differ from a country in which the information center 300 and the building 100 are located. When the data center 200 is located in a country that differs from the building 100, the data center 200 is to transmit an SMS message to the building 100 in a foreign country. In addition, in this case, the building 100 is to transmit an SMS message to the data center 200 in a foreign country.

In addition, there may be cases where a country in which relay stations, line facilities, and the like (hereinafter, referred to as "relay stations and the like") of the analog public telephone network 400 are installed is the same country as any of the countries in which the data center 200, the information center 300, and the building 100 are located and, in other cases, the country in which the relay stations and the like are located differs from any of the countries in which the data center 200, the information center 300, and the building 100 are located. In a similar manner, there may be cases where a country in which respective nodes, line facilities, and the like (hereinafter, referred to as "nodes and the like") of the first IP network 501 and the second IP network 502 are installed is the same country as any of the countries in which the data center 200, the information center 300, and the building 100 are located and, in other cases, the country in which the nodes and the like are located differs from any of the countries in which the data center 200, the information center 300, and the building 100 are located. In addition, cases are conceivable where the country in which the relay stations and the like of the analog public telephone network 400 are installed is the same as the country in which the respective nodes and the like of the first IP network 501 and the second IP network 502 are installed but, at the same time, cases are conceivable where the country in which the relay stations and the like of the analog public telephone network 400 are installed differs from the country in which the respective nodes and the like of the first IP network 501 and the second IP network 502 are installed.

Furthermore, a country in which the relay stations and the like of the analog public telephone network 400 which are passed through in one communication are installed is not limited to one country and, some cases, communication may pass through relay stations and the like located in a plurality of countries. In a similar manner, a country in which the nodes and the like of the first IP network 501 or the second IP network 502 which are passed through in one communication are installed is not limited to one country and, some cases, communication may pass through nodes and the like located in a plurality of countries.

Therefore, for example, there may be cases where communication between the information center 300 and the building 100 located in a same country is performed via relay stations and the like of the analog public telephone network 400 installed in a country that differs from the country in which the information center 300 and the building 100 are located or cases where the communication is performed via nodes and the like of the first IP network 501 installed in a country that differs from the country in which the information center 300 and the building 100 are located. In such cases, as described earlier, the country in which the relay stations and the like or the nodes and the like which the communication passes through are installed may exist in plurality.

In addition, for example, there may be cases where communication between the building 100 and the data center 200 located in different countries is performed via relay stations and the like of the analog public telephone network 400 installed in a third country which differs from both the country in which the building 100 is located (a first country) and the country in which the data center 200 is located (a second country) or cases where the communication is performed via nodes and the like of the first IP network 501 installed in the third country. In such cases, as described earlier, the country (the third country) in which the relay stations and the like or the nodes and the like which the communication passes through are installed may exist in plurality.

As described above, the elevator system according to the present invention also assumes cases where communication among the building 100, the data center 200, and the information center 300 via the analog public telephone network 400, the first IP network 501, or the second IP network 502 is performed across a plurality of countries.

The elevator system configured as described above is an elevator system which stores, in the server 210, information on the elevator 110 installed in the building 100 which is communicably connected to the data center 200 in which the server 210 is installed, the building 100 and the data center 200 being communicable independently via the first IP network 501 that is a first network and the analog public telephone network 400 that is a second network, respectively. In addition, the building 100 is provided with: an information collection device 112 configured to collect information on the elevator 110; a sorting device 130 configured to determine which of the first network and the second network is to be used as a transmission path via which the information on the elevator 110 collected by the information collection device 112 is to be transmitted to the data center 200; and a communication device 120 configured to transmit the information on the elevator 110 collected by the information collection device 112 to the data center 200 via the transmission path determined by the sorting device 130.

Therefore, information on the elevator 110 can be stored in the server 210 and, furthermore, an occurrence of an anomaly in the elevator 110 can be perceived from the remotely-located data center 200 even when a failure occurs on any of a first network and a second network between the elevator 110 and the server 210.

In addition, when the network monitoring unit 213 of the data center 200 detects an anomaly of the first IP network 501, the network monitoring unit 213 transmits anomaly information of the first IP network 501 to the building 100. Therefore, on the side of the building 100, since an occurrence of an anomaly in the first IP network 501 can be perceived before attempting data transmission to the data center 200, wasteful attempts at data transmission can be suppressed and, at the same time, an appropriate response can be made by having the building 100 side be aware of an anomaly of the first IP network 501 in advance.

Furthermore, the network monitoring unit 213 transmits the anomaly information of the first IP network 501 to the building 100 via the analog public telephone network 400 using SMS. Therefore, anomaly information can be reliably and inexpensively conveyed to the building 100 by utilizing the existing analog public telephone network 400.

INDUSTRIAL APPLICABILITY

The present invention can be utilized in elevator systems which store information on an elevator installed in a building in a server installed in a data center.

REFERENCE SIGNS LIST

100 Building
110 Elevator
111 Elevator control device
112 Information collection device
120 Communication device
130 Sorting device
131 Mode change control unit
132 Information determination unit
133 Path change unit
134 Data format change unit
135 Notification unit
136 Notification control unit
137 Storage unit
200 Data center
210 Server
211 Server control unit
212 Server storage unit
213 Network monitoring unit
220 First SMS message transmitting/receiving device
221 First transmission/reception control unit
222 Log format change unit
300 Information center
310 Monitoring terminal
320 Second SMS message transmitting/receiving device
321 Second transmission/reception control unit
322 Response change unit
400 Analog public telephone network
501 First IP network
502 Second IP network

The invention claimed is:

1. An elevator system which stores, in a server, information on an elevator installed in a building that is communicably connected to a data center in which the server is installed, the building and the data center being communicable independently via a first network or a second network, comprising:
a monitoring terminal installed in an information center communicably connected to the building via the second network, the monitoring terminal being configured to monitor a state of the elevator, wherein
the building comprises:
an information collection device configured to collect information on the elevator;
a sorting device configured to determine which of the first network and the second network is to be used as a transmission path via which the information on the elevator collected by the information collection device is to be transmitted to the data center; and a communication device configured to transmit the information on the elevator collected by the information collection device to the data center via the transmission path determined by the sorting device, the sorting device is configured to:

determine the first network as the transmission path during normal time; and determine the second network as the transmission path when anomaly information of the first network is received from outside of the building, and the information on the elevator collected by the information collection device is transmitted to the information center in response to the sorting device determining that the second network is the transmission path.

2. The elevator system according to claim 1, wherein the first network is an IP network, and the second network is an analog public telephone network.

3. The elevator system according to claim 2, wherein the communication device is configured to use SMS to transmit the information on the elevator collected by the information collection device in response to the transmission path being, the second network.

4. The elevator system according to claim 1, wherein the sorting device is configured to determine the first network as the transmission path in response to recovery information of the first network being received from outside of the building, and retransmit, using the first network, information on the elevator collected by the information collection device during a period in which the second network is the transmission path.

5. The elevator system according to claim 1, comprising a network monitoring unit provided in the data center, the network monitoring unit being configured to, when an anomaly of the first network is detected, transmit anomaly information of the first network to the building, wherein the network monitoring unit is further configured to transmit the anomaly information of the first network to the building via, the second network using SMS.

6. The elevator system according to claim 5, wherein the network monitoring unit is provided in the server.

7. The elevator system according to claim 1, wherein the sorting device is configured to transmit information on the determined transmission path to the data center and to change a data format to be used when smitting the information on the elevator in accordance with the determined transmission path.

8. The elevator system according to claim 7, wherein the server is configured to change, based on the information on the transmission path transmitted from the sorting device, a log storage method of the information on the elevator.

9. The elevator system according to claim 1, wherein the information center is communicably connected to the data center via a third network that is an IP network, and the monitoring terminal is configured to be capable of acquiring, via the third network, information on the elevator stored in the server and displaying the acquired information.

* * * * *